United States Patent [19]
Felcman et al.

[11] Patent Number: 5,754,396
[45] Date of Patent: May 19, 1998

[54] MODULAR DESKTOP COMPUTER HAVING ENHANCED SERVICEABILITY

[75] Inventors: Frances A. Felcman, Rosenberg; Juan M. Perez, Tomball; Gregory C. Franke, Houston; Kenneth B. Frame, Spring, all of Tex.

[73] Assignee: Compaq Computer Corporation, Houston, Tex.

[21] Appl. No.: 681,060

[22] Filed: Jul. 22, 1996

[51] Int. Cl.⁶ .................................. G06F 1/16; H05K 7/16
[52] U.S. Cl. ............................................... 361/683; 361/725
[58] Field of Search ..................... 364/708.1; 312/223.2, 312/263, 265.5; 361/683, 686, 725–727

[56] References Cited

U.S. PATENT DOCUMENTS

| | | | |
|---|---|---|---|
| 4,479,198 | 10/1984 | Romano et al. | 361/683 X |
| 4,979,075 | 12/1990 | Murphy | 361/686 |
| 5,136,468 | 8/1992 | Wong et al. | 361/683 |
| 5,175,669 | 12/1992 | Navia et al. | 361/683 |
| 5,278,351 | 1/1994 | Herrick | 361/683 |
| 5,338,214 | 8/1994 | Steffes et al. | 361/683 X |
| 5,466,059 | 11/1995 | Liu | 361/683 X |
| 5,495,389 | 2/1996 | Dewitt et al. | 361/683 |
| 5,544,006 | 8/1996 | Radloff et al. | 361/683 |
| 5,600,538 | 2/1997 | Xanthopoulos | 361/683 |

*Primary Examiner*—Michael W. Phillips
*Attorney, Agent, or Firm*—Konneker & Smith, P.C.

[57] ABSTRACT

A computer which includes modular structures incorporated therein provides enhanced serviceability. In a preferred embodiment, the computer has a chassis, a lid, a front bezel, an option card module, a system board module, a drive module, and a power supply module. The lid secures the option card module within the chassis. The option card module is removable from the chassis without disconnecting fasteners, option boards, or external cables therefrom. The system board module is received in the chassis and is secured therein by the option card module. The drive module has features which enable storage media devices to be conveniently installed therein and removed therefrom.

13 Claims, 5 Drawing Sheets

MODULAR DESKTOP COMPUTER HAVING ENHANCED SERVICEABILITY

BACKGROUND OF THE INVENTION

1. Field of the Invention

The present invention relates generally to structural designs for electronic devices and, in a preferred embodiment thereof, more particularly provides a desktop computer having enhanced serviceability.

2. Description of Related Art

Most of the first mass-produced personal computers were very simply constructed. A central processing unit (CPU) of a personal computer was typically contained in a rectangular sheet metal box which had a sheet metal lid that wrapped around the sides and front of the box. However, only a person familiar with hand tools and computer architecture, and possessing superior patience, was suited for performing service on any components within the box.

Few improvements in the structural design of personal computers have been made since. The CPU is still typically contained within a sheet metal box with a sheet metal lid. The lid is usually secured to the box with multiple screws and includes a front bezel that aligns with disk drive openings, lights, switches, etc. which are located on, and possibly protrude from, the front of the box.

A system board (also known as a "motherboard") is typically secured to an inner bottom side of the box with multiple screws and is usually all but inaccessible until most other components within the box are removed. This means that, if service of the system board is required, the computer must be essentially completely disassembled, at great cost in time and expense. Frequently, such disassembly by an inexperienced or inept person results in damage to one or more of the removed components. Even when the service is performed by a competent professional, damage sometimes occurs due to the large number of delicate components involved.

Of particular concern are option boards (also called "daughter boards"), such as sound cards, video cards, communications cards, etc., which plug into the system board and permit adaptation of the computer to a particular user's needs. Typically, the option boards are individually connected to the system board using card edge connectors. Where the system board is horizontally disposed on the bottom side of the box, the option boards are usually vertically disposed (and, therefore, orthogonal to the system board), such that one end of each of the option boards faces the rear of the box.

The option boards are typically secured to the rear of the box with screws, with the ends of the option boards aligning with openings formed through the rear of the box so that external cables may be connected to the option boards, switches on the option boards may be accessed, etc. Removal of the option cards generally involves removal of the external cables and any other attachments to the option boards extending through the openings on the rear of the box, removal of the screws securing the option boards to the box, and removal of any internal cables connecting any of the option boards to any other component within the box, such as a speaker. In some modern personal computers, there may be eight or more option boards to remove, thus requiring significant time and expense to service the computer.

Storage media devices, such as the disk drives (both "hard" and "floppy"), tape drives, CD ROM drives, etc., are typically secured with screws into sheet metal enclosures which, in turn, are secured within the computer box. The devices are connected by cables to the system board, one or more option boards, power supply, and/or indicator lights, etc. Removal of a storage media device for servicing of the device or to permit servicing of another component, such as the system board, is typically one of the more difficult operations performed. Access to the screws and cables is usually limited at best. When servicing is completed and the device is re-installed, achieving alignment between the device and the front bezel of the lid is generally difficult since the lid must align with the sides of the box, the top of the box, the front of the box, and the sheet metal enclosure containing the device.

Another disadvantage of common computer structural designs is that they lend themselves only to piecewise assembly. In other words, they are typically assembled one component after another. This means that the computer manufacturer must maintain an inventory of each component, or precisely schedule delivery of each component at an appropriate time for assembly of the computer.

It would be much more efficient and economical for the computer manufacturer to maintain an inventory of easily interconnected modules, so that final assembly of the computers would consist of merely interconnecting the modules, such as power supply, storage media device, system board, and option board modules, into a computer box. Such an assembly would also lend itself to ease of servicing, since the module which requires servicing could be easily removed from the computer box and replaced on site.

From the foregoing, it can be seen that it would be quite desirable to provide a computer which does not require piecewise assembly of components in a computer box, which does not require the use of an inordinate number of screws and other fasteners for its assembly, which consists of easily interconnected modules, and which has enhanced serviceability, but which is also durable and structurally rigid. It is accordingly an object of the present invention to provide such a computer.

SUMMARY OF THE INVENTION

In carrying out principles of the present invention, in accordance with a preferred embodiment thereof, an electronic device, representatively a computer, is provided which has a modular structure. The modular structure enables the computer to be economically and conveniently assembled and maintained. Various components of the computer interconnect in a manner which greatly reduces the number of fasteners required to assemble the computer.

In broad terms, an electronic device, representatively a computer, is provided which includes features enhancing its serviceability. The electronic device includes a chassis and an option card module.

The chassis has opposing laterally spaced apart front and rear portions. In an illustrated embodiment, the front and rear portions are generally planar.

The option card module structurally interconnects the chassis front and rear portions and is removable therefrom. The option card module has opposing laterally spaced apart front and rear portions, the module front portion being releasably secured to the chassis front portion and the module rear portion being releasably secured to the chassis rear portion.

A generally planar top portion of the option card module structurally interconnects the module front portion and the module rear portion. The top portion is orthogonally disposed relative to the chassis front portion.

A plate on the module structurally interconnects the module front, rear, and top portions. The plate is orthogonally disposed relative to the top portion.

For a computer having a chassis, the chassis having an opening formed through a front portion thereof, a storage media device module is also provided. The storage media device module includes a frame and abutments.

The frame is slidably received in the chassis opening. A cavity capable of receiving a storage media device is formed on the frame.

The frame further has first and second opposing sidewall portions laterally straddling the cavity. The first sidewall portion has a slotted first aperture extending rearwardly from a front edge thereof, and the second sidewall portion has second and third apertures formed therethrough. When the frame is slidably displaced in the opening, the chassis front portion is laterally intermediate the second and third apertures.

The abutments laterally straddle the frame. They permit sliding displacement of the frame through the opening, but restrict lateral displacement of the frame relative to the chassis.

In another aspect of the present invention, a computer is provided which includes an option card module, a system board module, and a drive module. Due to a unique configuration thereof, the option card module engages the system board module to prevent its removal from the computer during normal use. The computer also has a chassis with opposing laterally spaced apart front and rear portions, the front portion having an opening formed therethrough.

The option card module is removable from the computer and structurally interconnects the chassis front and rear portions. The option card module also has opposing laterally spaced apart front and rear portions, and a first member projecting from the option card module rear portion. The option card module front portion is releasably secured to the chassis front portion and the option card module rear portion is releasably secured to the chassis rear portion. The option card module further has a plate structurally interconnecting its front and rear portions.

The system board module is removably, slidingly, and operatively received in the chassis. A second member projects from the system board module. The first and second members are complementarily shaped, and the second member cooperatively engages the first member when the system board module is operatively received in the chassis and the option card module is structurally interconnected with the chassis, such that the option card module secures the system board module within the chassis.

The drive module is slidably received in the opening. A cavity formed on the drive module is capable of receiving a storage media device therein.

DETAILED DESCRIPTION

Figure 1:
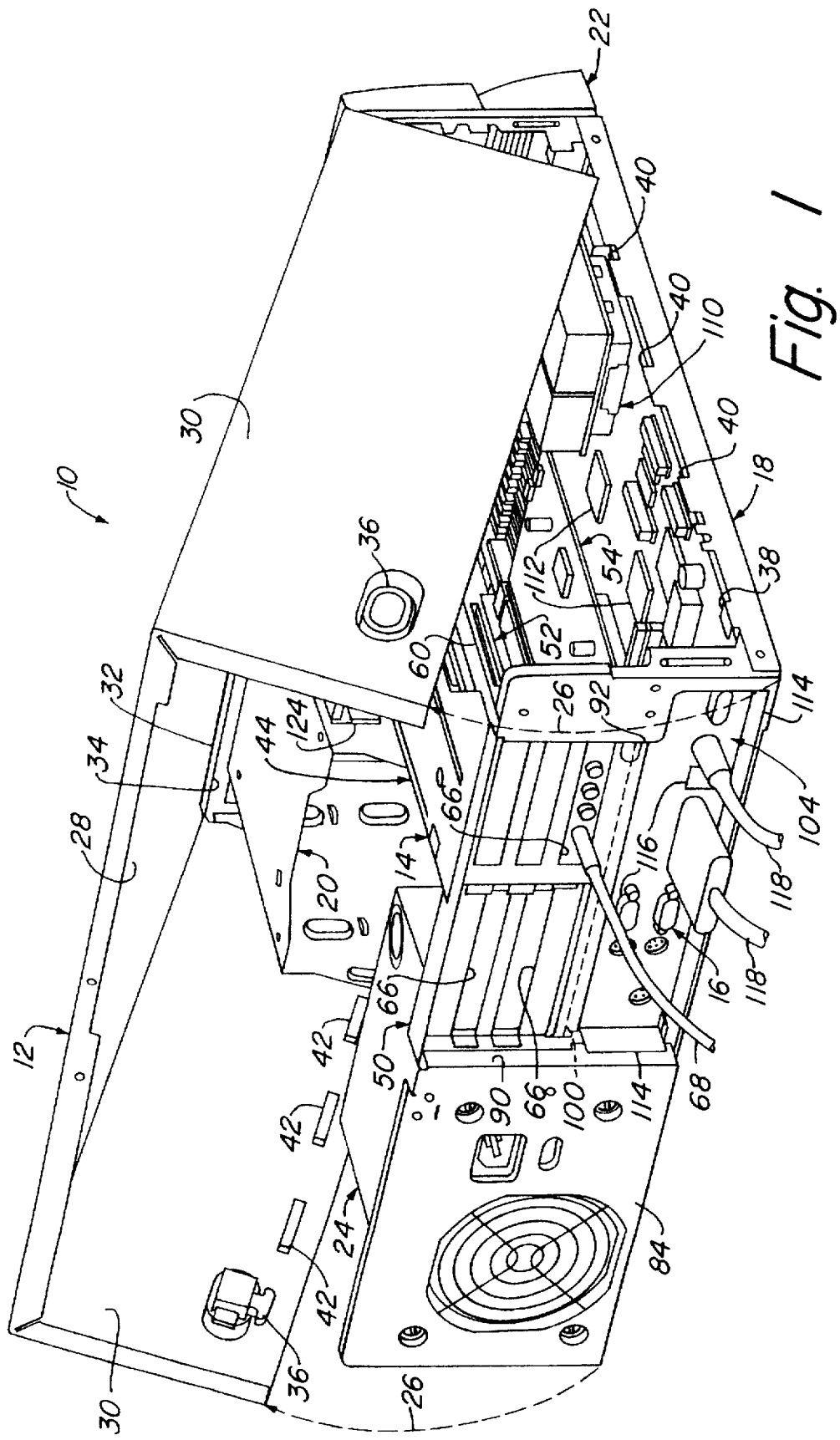
FIG. 1 is a top rear perspective view of a computer embodying principles of the present invention, showing a rear portion of the computer with a lid thereof being rotated upwardly and forwardly relative to a chassis of the computer.

Perspectively illustrated in FIG. 1 is an electronic device, representatively a desktop computer 10. It is to be understood that the computer 10 may be another electronic device, and may also be another type of computer, such as a tower, notebook, or subnotebook computer, and may be horizontally disposed or vertically disposed during manufacture or use thereof, or otherwise oriented, without departing from the principles of the present invention. In the following detailed description of the embodiment representatively illustrated in the accompanying figures, terms, such as "upwardly", "forward", "rear", "vertical", "horizontal", etc., are used to describe the computer 10 as it is representatively illustrated and are not to be understood as limiting the scope of the present invention.

FIG. 1 is a rear perspective view of the computer 10. The computer 10 includes a lid 12, an option card module 14, a system board module 16, a chassis 18, a drive module 20, a front bezel 22, and a power supply 24. Due to its modular construction, the computer 10 is easily assembled and serviced, as will be readily apparent upon consideration of the detailed description hereinbelow. In FIG. 1 the lid 12 is shown partially rotated upwardly and forwardly, as indicated by dashed arrows 26, but it is to be understood that in normal use the lid 12 is secured to the chassis 18.

The lid 12 has a top portion 28, which is generally planar and horizontally disposed, and opposing, spaced apart, and vertically disposed side portions 30. A forward edge 32 of the top portion 28 is hingedly and removably attached to a front vertical portion 34 of the chassis 18. A latch 36 is attached to each of the side portions 30 and releasably engages an inwardly extending tab 38 (only one of which is visible in FIG. 1) formed on the chassis 18.

The lid 12 is easily removed from the computer 10 for access to the interior thereof, by depressing both of the latches 36, rotating the lid upwardly and forwardly about the forward edge 32, as indicated by arrows 26, and lifting the forward edge away from the chassis front portion 34. During assembly of the computer 10, the lid 12 is easily secured to the chassis 18 by reversing the above steps. As will be more fully described hereinbelow, when the lid 12 is secured to the chassis 18, the option card module 14 and system board module 16 are thereby also secured within the chassis.

Downward pivoting of the lid 12 and securement thereof to the chassis 18 also engages a series of horizontally spaced apart vertically upstanding tabs 40 formed on the chassis with a corresponding series of horizontally spaced apart loops 42 on interior sides of each of the lid side portions 30. Cooperative engagement of the tabs 40 with the loops 42 enhances the structural rigidity of the computer 10 and restricts horizontal flexing of the side portions 30.

Note that the lid 12 is separate from the bezel 22, which is attached to the chassis front portion 34. In this manner, the bezel 22 may be accurately aligned with drives, indicator lights, switches, etc. which may be on the chassis front portion 34. It is also important to note that such alignment of the bezel 22 with the chassis front portion 34 is unaffected by removal of the lid 12 for service of the computer 10, or by installation of the lid during assembly.

Figure 2:
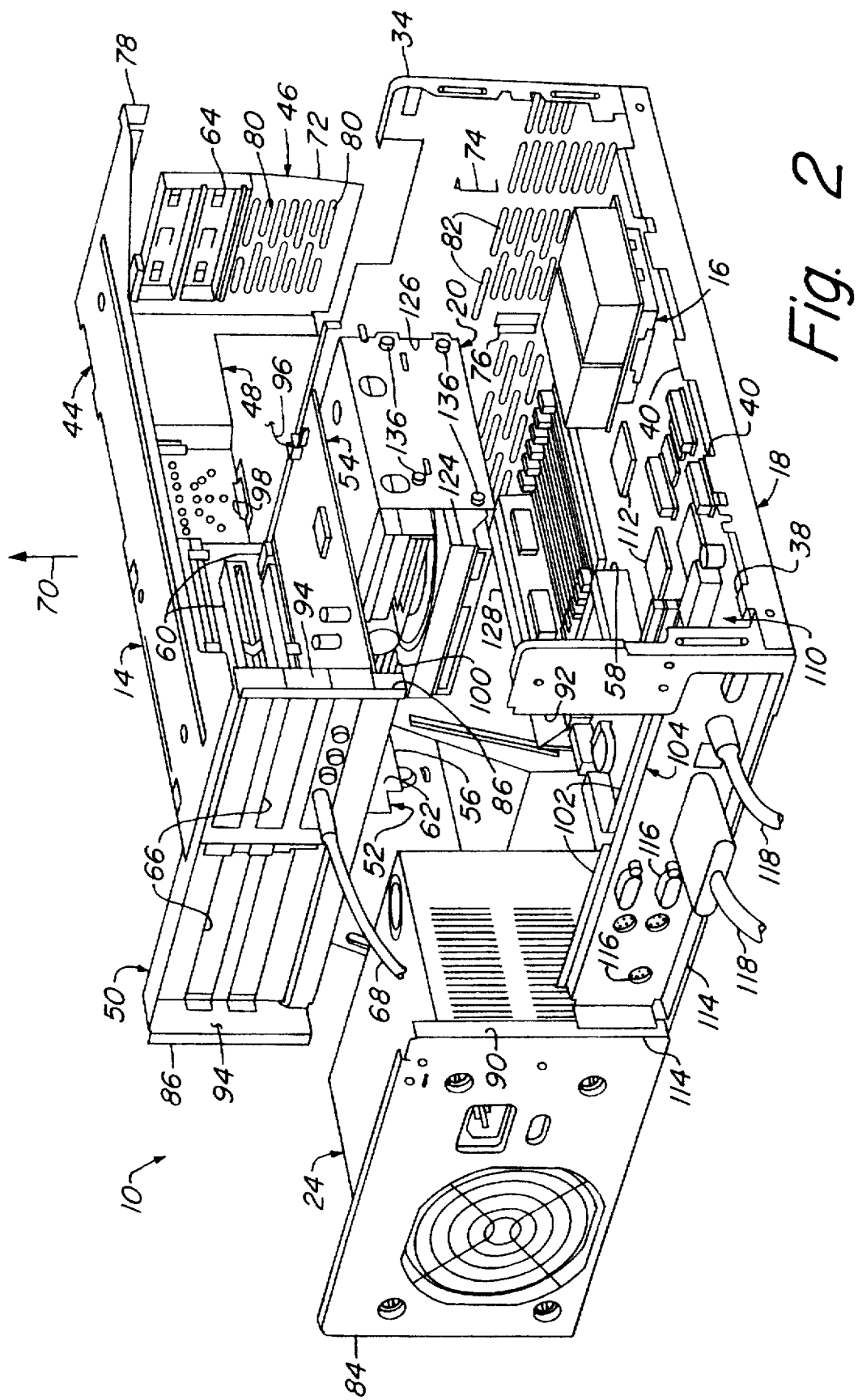
FIG. 2 is a top rear perspective view of the computer, showing an option card module thereof being removed from the computer chassis.

Referring additionally now to FIG. 2, the computer 10 is shown with the lid 12 completely removed. In this view, the manner in which the option card module 14 may be removed from the computer 10, or, conversely, installed into the computer, may be clearly seen.

The option card module 14 includes a generally planar and horizontally disposed top portion 44, a generally planar and vertically disposed front portion 46, a generally planar and vertically disposed stiffening plate 48, a vertically disposed rear portion 50, and a vertically disposed option card 52. An option board 54 is representatively illustrated as being operatively and horizontally installed in the option card module 14. When the option card module 14 is operatively installed in the chassis 18, as described more fully hereinbelow, a downwardly extending edge 56 of the option card 52 operatively engages a card edge connector 58 on the system board module 16, thereby electrically interconnecting the option board 54 with the system board module. For illustrative clarity, only one option board 54 is shown in the option card module 14, but it is to be understood that multiple option boards may be in the option card module without departing from the principles of the present invention.

The option board 54 is electrically interconnected to the option card 52 via one of a series of vertically spaced apart card edge connectors 60 disposed on each opposite side 62 (only one of which is visible in FIG. 2) of the option card 52. In this manner, multiple option boards 54 may be connected to the option card 52, such that the horizontal option boards are vertically spaced apart. A slotted card end guide 64 is attached to the front portion 46 to support forwardly disposed ends of long option boards (not shown).

A rearwardly disposed end of the option board 54 is aligned with one of a series of spaced apart openings 66 formed through the rear portion 50. Access to connectors and/or switches, etc. on the option board 54 is provided thereby. In FIG. 2, an external cable 68 is representatively illustrated as being connected to the option board 54 via a corresponding one of the openings 66.

It is to be understood that it is not necessary that a cable, such as cable 68, be connected to each option board 54 in the option card module 14 for operation of the computer 10. However, it is a particular benefit of the present invention that, where the cable 68 is connected to the option board 54 via one of the openings 66, the cable does not have to be disconnected from the option board prior to removal of the option card module 14 from the computer 10.

After the lid 12 has been removed as previously described, the option card module 14 may be removed from the computer 10 by merely raising it upwardly as indicated by arrow 70. When the option card module 14 is thus upwardly raised, card edge 56 disconnects from the connector 58 on the system board module 16 and the option card module 14 may be set aside from the computer 10, thereby providing additional access to the interior of the computer. With the option card module 14 so removed, additional access is also provided to the option card module itself, although it is to be understood that the option card module may also be serviced while it is operatively installed in the computer 10.

Note that no screws or other fasteners need be removed prior to lifting the option card module 14 from the computer 10. Therefore, if it is required to remove the option card module 14 from the computer 10, one must merely unlatch and remove the lid 12 as described previously, and lift upwardly on the option card module. The installed lid 12 prevents upward displacement of the option card module 14 during normal use of the computer 10.

Note, also, that these benefits are in addition to other benefits realized in assembly of the computer 10. Due to its modular design, the option card module 14 may be completely assembled separate from the computer 10, for example, by an outside vendor, and stocked as a single item, instead of as multiple components thereof. Due to its versatility, the option card module 14 may be fitted with alternate option boards and later installed into an alternate computer.

The option card module 14 requires no fasteners for its securement to the chassis 18, due to a unique configuration thereof which will be more fully described hereinbelow. In addition, the option card module 14 strengthens the chassis 18 and secures the system board module 16 within the chassis in a manner which will also be more fully described hereinbelow.

When the option card module 14 is assembled into the computer 10, a generally vertical edge 72 on the front portion 46 engages an inwardly extending tab 74 formed on the chassis front portion 34. Dislodgement of the edge 72 from engagement with the tab 74 is prevented by another inwardly extending tab 76 formed on the chassis front portion 34 which abuts the stiffening plate 48, thereby preventing lateral movement thereof. A forwardly projecting and downwardly extending tab 78 formed on the top portion 44 overlaps the chassis front portion 34 and restricts lateral flexing thereof. Thus, it may be seen that the front portion 46, stiffening plate 48, and top portion 44 are securely attached to the chassis front portion 34 when the option card module 14 is operatively installed in the computer 10, with no fasteners, such as screws, required for such securement.

When the option card module 14 is operatively installed in the computer 10, a series of openings 80 formed through the front portion 46 align with corresponding openings 82 formed through the chassis front portion 34 to provide ventilation for the interior of the computer.

The rear portion 50 is securely attached to a rear upstanding portion 84 of the chassis 18 in a unique manner which will now be described. When the option card module 14 is downwardly displaced for installation thereof in the chassis 18, vertically extending and outwardly projecting opposing tabs 86 formed on the rear portion 50 are received in channels 88 (see FIG. 5) attached to an interior side of the chassis rear portion 84. The channels 88 are each outwardly disposed relative to vertically extending and inwardly projecting opposing sides 90 formed adjacent an opening 92 formed through the chassis rear portion 84. Vertically extending and outwardly projecting opposing sides 94 (only one of which is visible in FIG. 2) formed on the rear portion 50 cooperatively engage the sides 90, such that appreciable horizontal displacement of the rear portion 50 relative to the chassis rear portion 84 is prevented. Cooperative engagement of the tabs 86 with the channels 88 also prevents lateral displacement of the rear portion 50 relative to the chassis rear portion 84, particularly in a direction orthogonal to the chassis rear portion, thereby restricting lateral flexing thereof. Thus, it may be seen that, when the option card module 14 is operatively installed in the computer 10, the rear portion 50 is securely attached to the chassis rear portion 84 without the necessity of screws or other separate fastening members.

It will be readily appreciated by one of ordinary skill in the art that, since the rear portion 50 is securely attached to the chassis rear portion 84, the front portion 46 is securely attached to the chassis front portion 34, and the top portion 44 and stiffening plate 48 structurally interconnect the front portion 46 to the rear portion 86, when the option card module 14 is operatively installed in the computer 10, the structural rigidity of the chassis 18 is substantially enhanced. Such structural rigidity enhancement is facilitated additionally by the orthogonal relationship between the top portion 14 and the stiffening plate 48, the orthogonal relationship between the top portion 14 and the rear portion 50, and the secure attachment of the top portion 44 to the chassis front portion 34.

As described hereinabove, external cables, such as cable 68, do not have to be disconnected from option boards, such as option board 54, when the option card module 14 is removed from, or re-installed in, the computer 10. An additional benefit derived from the present invention is that certain internal cables, such as cable 96 (see FIG. 2), also do not have to be disconnected when the option card module 14 is removed or replaced. Cable 96, which is at one end connected to an option board, such as option board 54, may be connected at its other end to another option board (not shown), a speaker (not shown), or other device carried on the option card module 14. Note that the option card module 14 includes a specially designed receptacle 98 for receiving a speaker (not shown) therein. Thus, if, for example, option board 54 is of a type known to those skilled in the art as a sound board, and internal cable 96 interconnects the option board to a speaker received in the receptacle 98, cable 96 will not need to be disconnected when option card module 14 is removed from, or replaced in, the computer 10.

As will be more fully described hereinbelow, the system board module 16 is slidingly received in the computer 10. When the system board module 16 is thus operatively installed in the computer 10, as representatively illustrated in FIGS. 1 and 2, and the option card module 14 is also operatively installed in the computer, rearward displacement of the system board module 16 relative to the chassis 18 is prevented by cooperative engagement of a laterally extending and inwardly projecting tab 100 formed on a lower end of the rear portion 50, with laterally extending and upwardly projecting tabs 102 formed on a rear portion 104 of the system board module.

Figure 3:
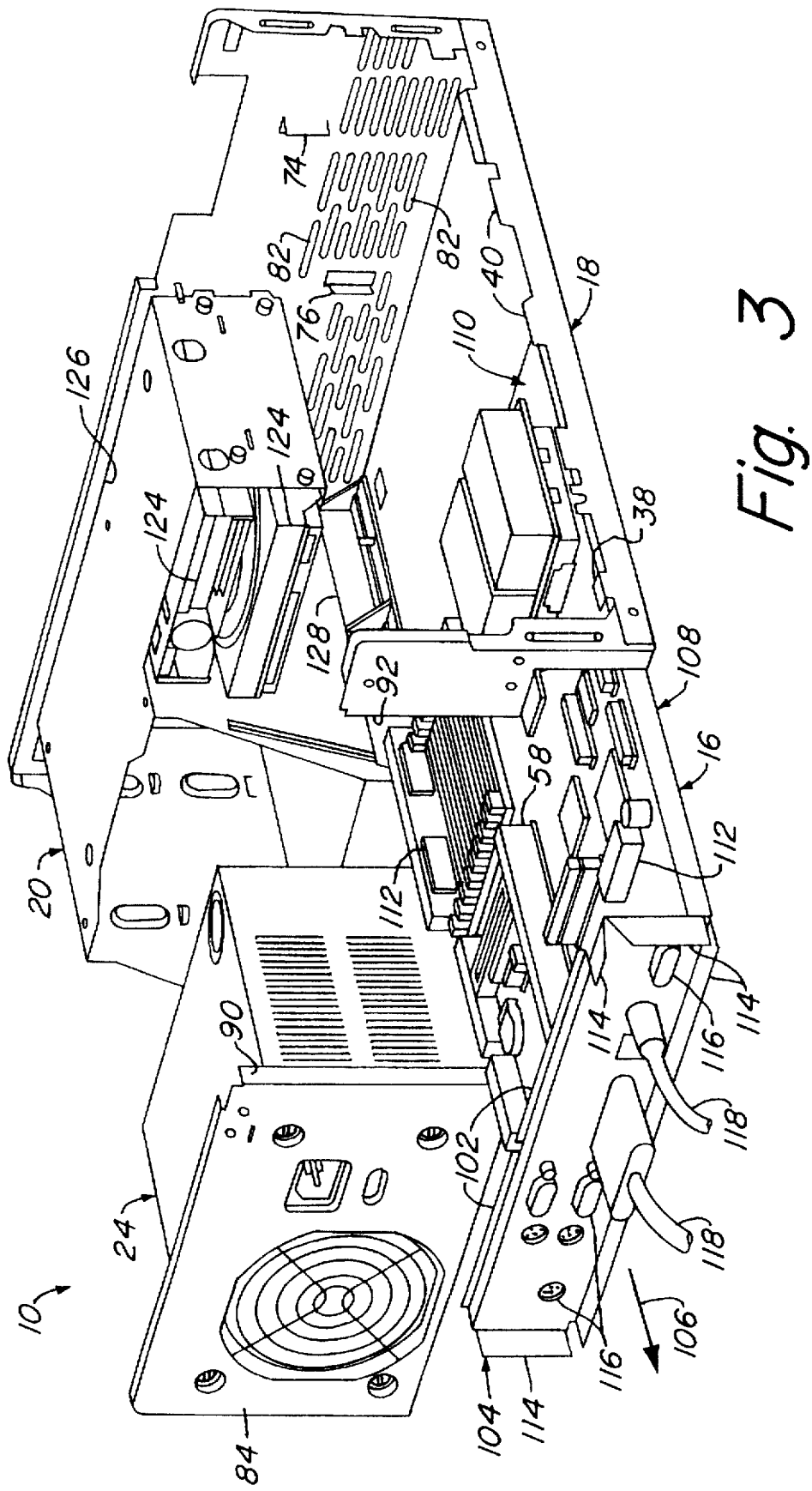
FIG. 3 is a top rear perspective view of the computer, showing a system board module thereof being removed from the computer chassis.

Referring additionally now to FIG. 3, the computer 10 is representatively illustrated with the system board module 16 partially removed from the chassis 18. The system board module 16 may easily be completely removed from the chassis 18 by rearwardly sliding the system board module with respect to the chassis, in the direction indicated by arrow 106, or operatively installed in the computer 10 by forwardly sliding the system module in the opposite direction. As more fully described hereinabove, the system board module 16 is operatively installed in the chassis 18 when tabs 102 may be cooperatively engaged with tab 100 on the option card module 14.

The system board module 16 includes a tray 108, which has the rear portion 104 attached thereto, and a system board 110, which has electronic devices 112, such as microprocessors, memory devices, etc., operatively connected thereto. Rearwardly projecting flanges 114 engage the opening 92 at its periphery when the system board module 16 is operatively installed in the chassis 18, to restrict electromagnetic emissions from the interior of the computer 10.

The rear portion 104 has connectors 116 protruding therethrough. External cables 118 are connected to various ones of the connectors 116. As will be readily appreciated, it is not necessary for any of cables 118 to be disconnected from connectors 116 in order to remove the system module 16 from the chassis 18.

When service is required to be performed on the system board module 16, it may be easily removed from the computer 10 by removing the lid 12 as described hereinabove, removing the option card module 14 as hereinabove described, and sliding the system board module rearwardly out of the chassis 18. Each of these operations may be accomplished without the need of removing fasteners, such as screws. Reassembly of the computer 10 is achieved by simply reversing the above steps.

Benefits of the modular design of the system board module 16 are similar to those of the option card module 14 previously described. In particular, the system board module 16 may be ordered from an outside vendor and stocked by a computer manufacturer as a single item. Additionally, the complete system board module 16 may be quickly and economically replaced on site by a service technician. Indeed, replacement of the complete system board module 16 is so easily accomplished that even untrained individuals may successfully perform the task.

Note that, fitted with properly designed and situated connectors (not shown), the system board module 16 may be automatically operatively interconnected with the power supply module 24 and the drive module 20 when the system board module is slid rearwardly into the chassis 18, in a manner similar to that described hereinabove for the interconnection of the option card module 14 with the system board module.

Figure 4:
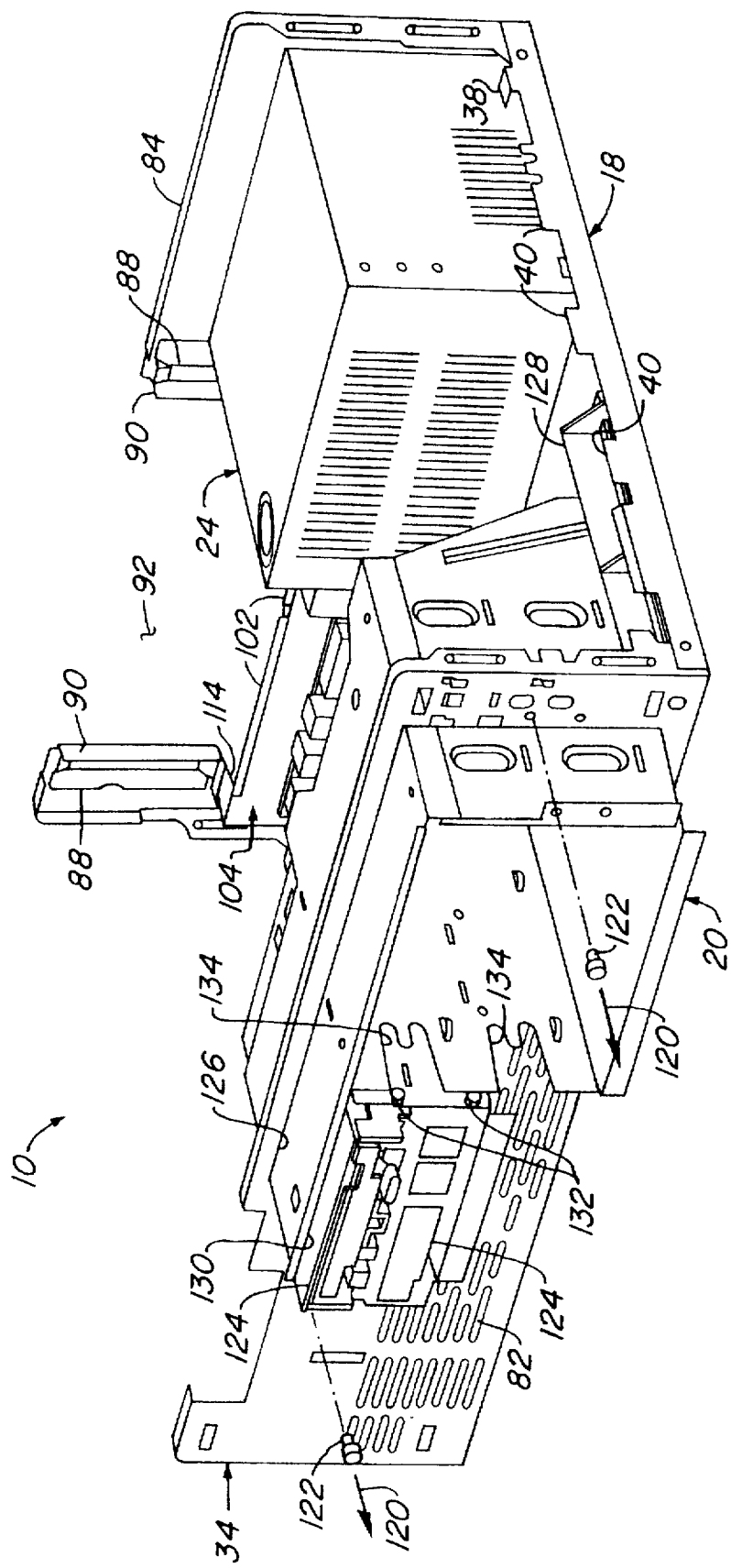
FIG. 4 is a top front perspective view of the computer, showing a drive module thereof being slid forwardly on the computer chassis.

Referring additionally now to FIG. 4, a front perspective view of the computer 10 is representatively illustrated with the drive module 20 forwardly displaced relative to the chassis 18 in the direction indicated by arrows 120. The front bezel 22 has been removed from the chassis front portion 34. Fasteners, such as screws 122, which secure the drive module 20 to the chassis 18, have been removed to permit such forward displacement of the drive module.

In the configuration shown in FIG. 4, access to storage media devices, such as drives 124, operatively installed in the drive module 20 is significantly enhanced. It is to be understood that devices different in number and type to those representatively illustrated may be utilized in drive module 20 without departing from the principles of the present invention. For example, any combination of CD ROM drives, floppy disk drives, hard disk drives, tape drives, etc. may be operatively installed in the drive module 20.

The drive module 20 slides through an opening 126 formed through the chassis front portion 34. The periphery of the opening 126 cooperatively engages the drive module 20 and restricts lateral displacement of the drive module in directions orthogonal to the arrows 120. Additionally, lateral displacement of the drive module 20 is restricted by vertically extending abutments 128 attached to the chassis 18.

Devices, such as drives 124, which are conventional, generally have cables and connectors (not shown) extending rearwardly therefrom. Forward displacement of the drive module 20 relative to the chassis 18 enhances access to such cables and connectors by increasing lateral separation of the drive module 20 from obstructions within the computer 10, such as power supply 24.

Drives 124 are secured within an opening 130 formed on the drive module 20. A fastener, such as screw 132, is installed in each of the drives 124 and rearwardly engages one of a series of slotted openings 134 formed on the drive module 20. Thus, when each of the drives 124 is initially installed in the drive module 20, screws 132 vertically and rearwardly align the drive with the opening 130 of the drive module, so that the drive may be additionally secured to the drive module as more fully described hereinbelow. After the drives 124 have been operatively installed in the drive module opening 130, screws 132 additionally restrict vertical and rearwardly lateral displacement of the drives relative to the drive module 20.

Figure 5:
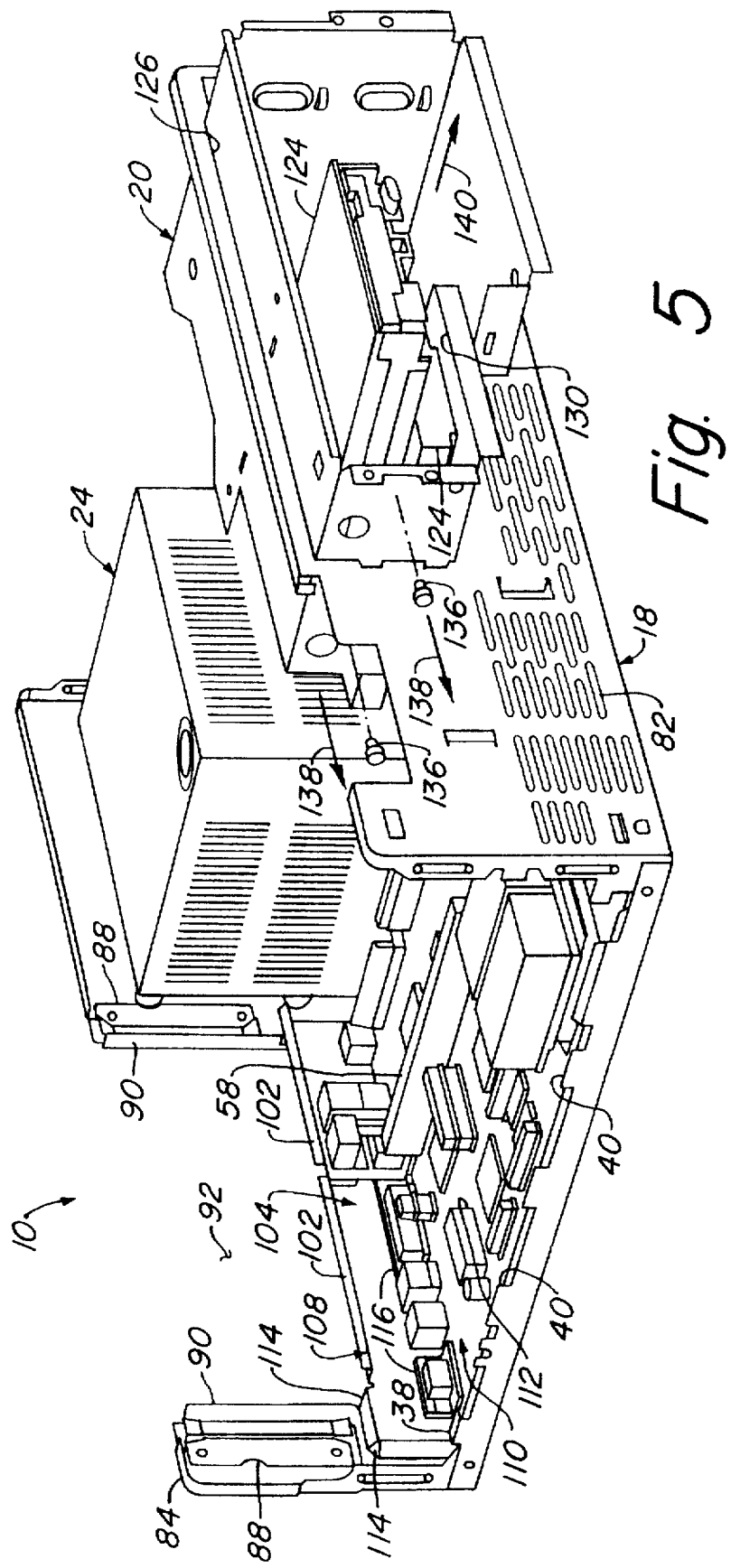
FIG. 5 is a top front perspective view of the computer, showing a disk drive thereof being removed from the drive module.

Referring additionally now to FIG. 5, the manner in which the drives 124 are secured to, and removed from, the drive module 20 may be clearly seen. Each of the drives 124 is attached to the drive module 20 with fasteners, such as screws 136. Screws 136 fix the position of each of the drives 124 relative to the drive module 20. When the screws 136 are removed, as indicated by arrows 138, the drives 124 may be forwardly removed from the drive module 20, as indicated by arrow 140.

The forward displacement of the drive module 20 relative to the chassis 18 described hereinabove and shown in FIGS. 4 and 5, enhances the accessibility of the screws 136 in addition to enhancing the accessibility of the cables and connectors (not shown) on the drives 124. Such enhanced accessibility permits the computer 10 to be quickly and economically assembled and serviced.

The foregoing detailed description is to be clearly understood as being given by way of illustration and example only, the spirit and scope of the present invention being limited solely by the appended claims.

What is claimed is:

1. An electronic device, comprising:

a chassis having opposing laterally spaced apart front and rear portions, said front and rear portions being generally planar;

a removable first module structurally interconnecting said chassis front and rear portions, said first module having opposing laterally spaced apart front and rear portions, said first module front portion being releasably secured to said chassis front portion and said first module rear portion being releasably secured to said chassis rear portion, said first module further having a generally planar top portion structurally interconnecting said first module front portion and said first module rear portion, said first module top portion being orthogonally disposed relative to said chassis front portion, a plate structurally interconnecting said first module front, rear, and top portions, said plate being orthogonally disposed relative to said first module top portion, and a generally planar option card attached to said plate, said option card having opposite side surfaces, a peripheral edge, and at least one first card edge connector attached to each of said opposite side surfaces, each of said first card edge connectors being electrically interconnected with said option card peripheral edge, and said first module top portion forming a portion of an enclosure at least partially enclosing said first card edge connectors; and a laterally slidingly removable second module operatively received in said chassis, said second module including a second card edge connector electrically interconnected with said option card peripheral edge, said first module cooperatively engaging said second module and securing said second module against laterally sliding removal from said chassis.

2. The electronic device according to claim 1, further comprising a circuit board carried on said chassis laterally intermediate said chassis front and rear portions, said second card edge connector being mounted on said circuit board and electrically interconnected therewith, said first card edge connectors being electrically interconnected with said circuit board when said first module is structurally interconnected with said chassis.

3. The electronic device according to claim 2, wherein said circuit board is structurally attached to said second module, wherein said second module has a first member projecting therefrom, and wherein said first module further has a second member projecting therefrom, said first and second members being complementarily shaped, and said second member cooperatively engaging said first member.

4. The electronic device according to claim 1, further comprising a cover removably attached to said chassis, said cover overlying said first module, and said cover securing said first module against structural disconnection from said chassis when said first module is structurally interconnected with said chassis and said cover is attached to said chassis.

5. The electronic device according to claim 1, wherein said chassis rear portion has first and second laterally spaced apart side portions, an opening formed intermediate said first and second side portions, and a first member attached to each of said first and second side portions adjacent said opening, and wherein said first module rear portion further has laterally opposite ends and a second member formed on each of said rear portion opposite ends, said first and second members being complementarily shaped, and each of said first members cooperatively engaging one of said second members when said first module is structurally interconnected with said chassis.

6. The electronic device according to claim 5, wherein said first members are channel members, and wherein said second members are elongated tabs.

7. A computer, comprising:

a chassis having opposing laterally spaced apart first and second portions;

a removable first module having opposing laterally spaced apart first and second portions, said first module first portion being releasably secured to said chassis first portion and said first module second portion being releasably secured to said chassis second portion, said first module further having a generally planar third portion structurally interconnecting said first module first portion and said first module second portion, a fourth portion structurally interconnecting said first module first, second, and third portions, and an option card attached to said fourth portion, said option card having opposite side surfaces, a peripheral edge, and at least one first card edge connector attached to each of said opposite side surfaces, each of said first card edge connectors being electrically interconnected with said option card peripheral edge, and said third portion forming a portion of an enclosure at least partially enclosing said first card edge connectors; and a laterally slidingly removable second module operatively received in said chassis, said second module including a second card edge connector electrically interconnected with said option card peripheral edge, said first module cooperatively engaging said second module and securing said second module against laterally sliding removal from said chassis.

8. The computer according to claim 7, further comprising a circuit board carried on said chassis laterally intermediate said chassis first and second portions, said second card edge connector being mounted on said circuit board and electrically interconnected therewith, said first card edge connectors being electrically interconnected with said circuit board when said first module is structurally interconnected with said chassis.

9. The computer according to claim 8, wherein said circuit board is structurally attached to said second module, wherein said second module has a first member projecting therefrom, and wherein said first module further has a second member projecting therefrom, said first and second members being complementarily shaped, and said second member cooperatively engaging said first member.

10. The computer according to claim 7, further comprising a cover removably attached to said chassis, said cover overlying said first module, and said cover securing said first module against structural disconnection from said chassis.

11. The computer according to claim 7, wherein said chassis second portion has first and second laterally spaced apart side portions, an opening formed intermediate said first and second side portions, and a first member attached to each of said first and second side portions adjacent said opening, and wherein said first module second portion further has laterally opposite ends and a second member formed on each of said rear portion opposite ends, said first and second members being complementarily shaped, and each of said first members cooperatively engaging one of said second members.

12. The computer according to claim 11, wherein said first members are channel members, and wherein said second members are elongated tabs.

13. A computer, comprising:

a chassis having first and second upstanding sides;

a first module laterally slidingly received within the chassis; and a second module removably securing the first side to the second side, the second module including a first portion configured for releasably engaging the first and second sides, a second portion attached and orthogonally disposed relative to the first portion, an option card attached to the second portion and having opposite sides, and at least one card connector attached to each of the opposite sides, the first portion forming a portion of an enclosure at least partially enclosing the card connectors, and the second module cooperatively engaging and securing the first module against laterally sliding removal from the chassis.

* * * * *